United States Patent [19]

Farris et al.

[11] Patent Number: 5,586,177
[45] Date of Patent: Dec. 17, 1996

[54] INTELLIGENT SIGNAL TRANSFER POINT (ISTP)

[75] Inventors: Robert D. Farris, Sterling; Dale Bartholomew, Vienna, both of Va.

[73] Assignee: Bell Atlantic Network Services, Inc., Arlington, Va.

[21] Appl. No.: 524,306

[22] Filed: Sep. 6, 1995

[51] Int. Cl.$^6$ .............................. H04M 7/00; H04M 3/42; H04Q 11/04; H04J 3/12
[52] U.S. Cl. .................. 379/230; 370/426; 379/207; 379/220; 379/229
[58] Field of Search .................. 379/94, 201, 207, 379/219, 220, 221, 230, 224, 229; 370/58.1, 60.1, 110.1

[56] References Cited

U.S. PATENT DOCUMENTS

| | | | |
|---|---|---|---|
| 4,191,860 | 3/1980 | Weber | 379/115 |
| 4,611,094 | 9/1986 | Asmuth et al. | 379/201 X |
| 4,611,096 | 9/1986 | Asmuth et al. | 379/230 X |
| 5,025,468 | 6/1991 | Sikand et al. | 379/309 X |
| 5,247,571 | 9/1993 | Kay et al. | 379/207 |
| 5,473,679 | 12/1995 | La Porta et al. | 379/207 X |

*Primary Examiner*—Krista M. Zele
*Assistant Examiner*—Harry S. Hong
*Attorney, Agent, or Firm*—Lowe, Price, LeBlanc & Becker

[57] ABSTRACT

An intelligent network, such as might provide telephone services or the like, comprises local communication links, one or more trunk circuits and a number of separately located central office switching systems. The network selectively provides switched call connections between at least two of the local communication links. The switching systems also exchange signaling messages via an interoffice signaling network, as part of the procedures for establishing call connections. The interoffice signaling network includes an Intelligent Signaling Transfer Point (ISTP) which communicates with the switching offices via signaling links that are separate from the local communication links and the trunk circuit(s). In accord with the present invention, the ISTP includes a database storing call processing data associated with a plurality of the local communication links for control of call processing through one or more of the central office switching systems. The ISTP also includes a program controlled processor. The processor recognizes a predetermined condition or trigger regarding the call and retrieves call processing information from the database. The ISTP may route the message to a distant network element to provide the necessary response, or the ISTP may formulate and transmit a response message, based on the call processing information and specific conditions relating to the call and/or the signaling message. The response message goes back through the ISTP and one of the signaling links to the central office switching system, to control subsequent processing of the call.

39 Claims, 6 Drawing Sheets

INTELLIGENT SIGNAL TRANSFER POINT (ISTP)

TECHNICAL FIELD

The present invention relates to a Common Channel Interoffice Signaling system, an intelligent packet switching system used therein as a signal transfer point and methods of operation thereof for conditional processing of signaling messages to provide intelligent network type control of an associated communications network.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Advanced Intelligent Network (AIN)
Answer Message (ANM)
Application Service Part (ASP)
Backward Indicator Bit (BIB)
Backward Sequence Number (BSN)
Call Processing Record (CPR)
Common Channel Signalling (CCS)
Common Channel Interoffice Signalling (CCIS)
Customer Identification Code (CIC)
Cyclic Redundancy Code (CRC)
Destination Point Code (DPC)
Fill in Signal Unit (FISU)
Global Title (GTT)
Initial Address Message (IAM)
Integrated Service Control Point (ISCP)
Integrated Services Digital Network (ISDN)
Intelligent Peripheral (IP)
Intelligent Signaling Transfer Point (ISTP)
ISDN User Part (ISDN-UP)
International Standards Organization (ISO)
Link Service Signaling Unit (LSSU)
Message Signaling Unit (MSU)
Message Transfer Part (MTP)
Multi-Services Application Platform (MSAP)
Open Systems Interconnection (OSI)
Operations, Maintenance, Application Part (OMAP)
Origination Point Code (OPC)
Plain Old Telephone Service (POTS)
Point in Call (PIC)
Point in Routing (PIR)
Service Control Point (SCP)
Service Information Octet (SIO)
Service Management System (SMS)
Service Switching Point (SSP)
Signaling Connection Control Part (SCCP)
Signaling Link Selection (SLS)
Signaling System 7 (SS7)
Signaling Point (SP)
Signaling Transfer Point (STP)
Subsystem Number (SSN)
Transaction Capabilities Applications Protocol (TCAP)

BACKGROUND ART

All telecommunications systems having multiple switching offices require signaling between the offices. The classic example relates to telephone networks. Telephone networks require signaling between switching offices for transmitting routing and destination information, for transmitting alerting messages such as to indicate the arrival of an incoming call, and for transmitting supervisory information, e.g. relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk circuit to the end office switching system serving the destination is set-up and maintained for the duration of signaling until that office informs the originating office of the busy line condition. As shown by this example, in-band signaling greatly increases congestion on the traffic channels, that is to say, the voice channels in the voice telephone network example. In-band signaling also is highly susceptible to fraud because hackers have developed devices which mimic in-band signaling.

Out-of-band signaling evolved to mitigate the problems of in-band signaling. Out-of-band signaling utilizes separate channels, and in many cases separate switching elements. As such, out-of-band signaling reduces congestion on the channels carrying the actual communication traffic. Also, messages from the end users always utilize an in-band format and remain in-band, making it virtually impossible for an end user to simulate signaling messages which ride on an out-of-band channel or network. Out-of-band signaling utilizes its own signal formats and protocols and is not constrained by protocols and formats utilized for the actual communication, therefore out-of-band signaling typically is considerably faster than in-band signaling.

Out-of-band signaling networks typically include data links and one or more packet switching systems. Out-of-band signaling for telephone networks is often referred to as Common Channel Signaling (CCS) or Common Channel Interoffice Signaling (CCIS). Most such signaling communications for telephone networks utilize signaling system 7 (SS7) protocol. An SS7 compliant CCIS network comprises data switching systems designated Signaling Transfer Points (STPs) and data links between the STPs and various telephone switching offices of the network.

In recent years, a number of new service features have been provided by an enhanced telephone network, sometimes referred to as an Advanced Intelligent Network (AIN). AIN type call processing relies heavily on signaling communication via the CCIS network. In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a CCIS link to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

An AIN type network for providing an Area Wide Centrex service was disclosed and described in detail in commonly assigned U.S. Pat. No. 5,247,571 to Kay et al., the disclosure of which is entirely incorporated herein by reference. AIN type processing in such a system is controlled by the ISCP, which typically is operated by the local exchange carrier.

Similar intelligent services, particularly advanced 800 number services, may be offered by other carriers. Existing 800 number call processing utilizes a central 800 database (CMSDB) in a Service Control Point (SCP), to control switching operations through multiple end offices. Local and/or toll offices of the network detect dialing of an 800 number, suspend call processing, compile a call data message and forward that message via a CCIS link to the 800 database in the SCP. The SCP accesses stored data tables identified by the dialed 800 number to translate the received message data into a call control message, including a plain old telephone service (POTS) type destination telephone number. In this system, if the SCP does not currently store the destination number corresponding to a particular 800 number, the SCP will obtain the destination number from a national 800 database referred to as a Service Management System (SMS). The SCP transmits the call control message to the office of the network via CCIS link, and the network offices use the POTS destination telephone number in the call control message to complete the particular call.

Examples of 800 number call processing routines are disclosed in U.S. Pat. No. 4,191,860 to Weber, U.S. Pat. No. 4,611,094 to Asmuth et al. and U.S. Pat. No. 4,611,096 to Asmuth et al.

The intelligent call processing provided by the ISCP and SCP type centralized databases facilitates a wide range of services, many of which can be customized to meet the needs of individual subscribers. To service a large number of customers in this manner, particularly where every call to or from every intelligent service subscriber receives query and response processing through a centralized database, places a heavy signaling burden on the interoffice signaling network. Also, typically, a query and response cycle between a switching office and a remote database requires approximately 600 microseconds. Although this time appears short to a person placing a call, the delay is quite long in terms of electronic or computer processing capabilities by the switching offices. During this waiting time, resources of the switch that launched the call are sitting idle, reserved for the call but waiting for the response from the database. When multiplied by millions of calls, the waiting time burdens switching office resources that otherwise could be processing other calls and thereby generating additional revenue. As the number of intelligent services utilizing the query and response procedure continues to increase, the need for a more rapid technique to provide the necessary control information to the switching offices becomes increasingly acute.

Also, the various intelligent services provided through earlier systems have relied on 'triggers' set in the individual switching offices. Occurrence of a call processing event recognized as a trigger causes the switching office to formulate a special application message in Transaction Capabilities Applications Protocol (TCAP). Triggers must be set in many individual offices, and each such office must formulate the specialized type messages. Upgrading individual switching offices to perform these functions is expensive.

DISCLOSURE OF THE INVENTION

The present invention overcomes the above noted problems by providing a database, storing call processing control information, in a signaling transfer point (STP) of the interoffice signaling network. The STP also is adapted to trigger access to records within that database in response to signaling messages when certain conditions are met. As such, the STP becomes an intelligent node of the network, i.e. an Intelligent Signaling Transfer Point (ISTP)

A network implementing the present invention includes local communication links, one or more trunk circuits and at least two separately located central office switching systems. The trunk circuits interconnect the central office switching systems. The network selectively provides switched call connections between at least two of the local communication links. The network also includes a signaling transfer point (STP) for routing signaling messages and signaling links coupling the signaling transfer point to the central office switching systems. The signaling links are separate from the local communication links and the trunk circuit.

In accord with one aspect of the present invention, the STP includes a data switch for switching messages between the signaling links. A database stores call processing data associated with a plurality of the local communication links for control of call processing through one or more of the central office switching systems. A program controlled processor in the STP recognizes a predetermined call related condition with regard to a signaling message from one of the central office switching systems that is processing the call. In response, the processor obtains call processing information from the database and transmits a signaling message containing the call processing information to the one central office switching system to control subsequent processing of the call. In view of the inclusion of the database and the intelligent processing, the STP becomes an ISTP.

In this manner, the ISTP may screen signaling messages and formulate and return response messages in some cases, without the query going to a distant node of the network to formulate and return a response. For example, the network may include a service control point (SCP). As noted above, the transmission of messages to the SCP and waiting for a response ties up network resources. The ISTP therefore responds faster to the messages under certain conditions and passes only a limited number of messages, i.e. those meeting specific conditions, to the SCP for processing.

As another example, the ISTP may provide screening services based on messages normally transmitted between switching offices during call set-up processing. The screening criteria is established within the database in the ISTP. If the ISTP determines that a first condition is met, e.g. a call should not be completed in view of criteria defined by the subscriber, then the ISTP transmits a busy status indication to the originating office. If the ISTP determines that a second condition is met, e.g. a call should be completed in view of criteria defined by the subscriber, then the ISTP passes the signaling message on to the terminating office for normal call set-up processing. The screening functionality can apply to outgoing calls from a subscriber's line or to incoming calls to a subscriber's telephone number. Triggers for this type of screening are set in the ISCP, not in the individual switching offices.

Also, certain calls may trigger a query to the STP itself. In this type of operation, a switching office processing a call detects an AIN type trigger event. That office sends a query message through the signaling network to the ISTP. The ISTP uses at least some information from the query message to access a call processing record in the database within the ISTP and formulate an appropriate response message. The ISTP transmits the response message back to the switching office, and that office uses information from the response message to continue its processing of the particular call.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

The present invention provides customized processing of signaling messages at a packet switching node of a signaling network, to achieve intelligent routing of calls through offices of a communication network. The concepts of the present invention may apply to a variety of out-of-band signaling networks. The preferred embodiment, however, relates to improvements in an SS7 compliant common channel interoffice signaling system used in a public switched telephone network. In such an implementation, signaling packets are routed through one or more Signaling Transfer Points (STPs). At least one STP includes or connects to an associated database of call processing records (CPRs) and serves as an ISTP in accord with the present invention.

The database associated with the ISTP provides instructions for processing the signaling messages to provide customized call processing services through the communication network. The call processing records effectively specify how the ISTP should process a message under certain predetermined conditions, to provide a subscriber one or more selected service features. For example, the ISTP may pass a query message relating to one subscriber's service under a first condition (e.g. at a first time). Some other network node formulates a response and sends the response back through the ISTP. Under other conditions (e.g. at other times), the ISTP will itself process the query message and provide an appropriate response message. The inclusion or association of the database with the ISTP eliminates the delay incurred by forwarding queries to a separate database and waiting for the response to return to the ISTP for subsequent transport to the switching office which launched the query.

Another advantage of the use of the database in the ISTP is that the processing by the ISTP need not always rely on specialized triggers and specialized TCAP messages. During processing of many normal calls, an originating office will transmit a signaling message intended for a terminating office, i.e. serving the line of the called party. The ISTP can trigger access to the internal database in response to such messages and formulate certain responses, to provide the customized processing without the delay for transmission to and from the distant terminating office.

To facilitate understanding of the present invention, it will be helpful first to review the architecture and operation of a telephone network having CCIS capabilities.

Figure 1:
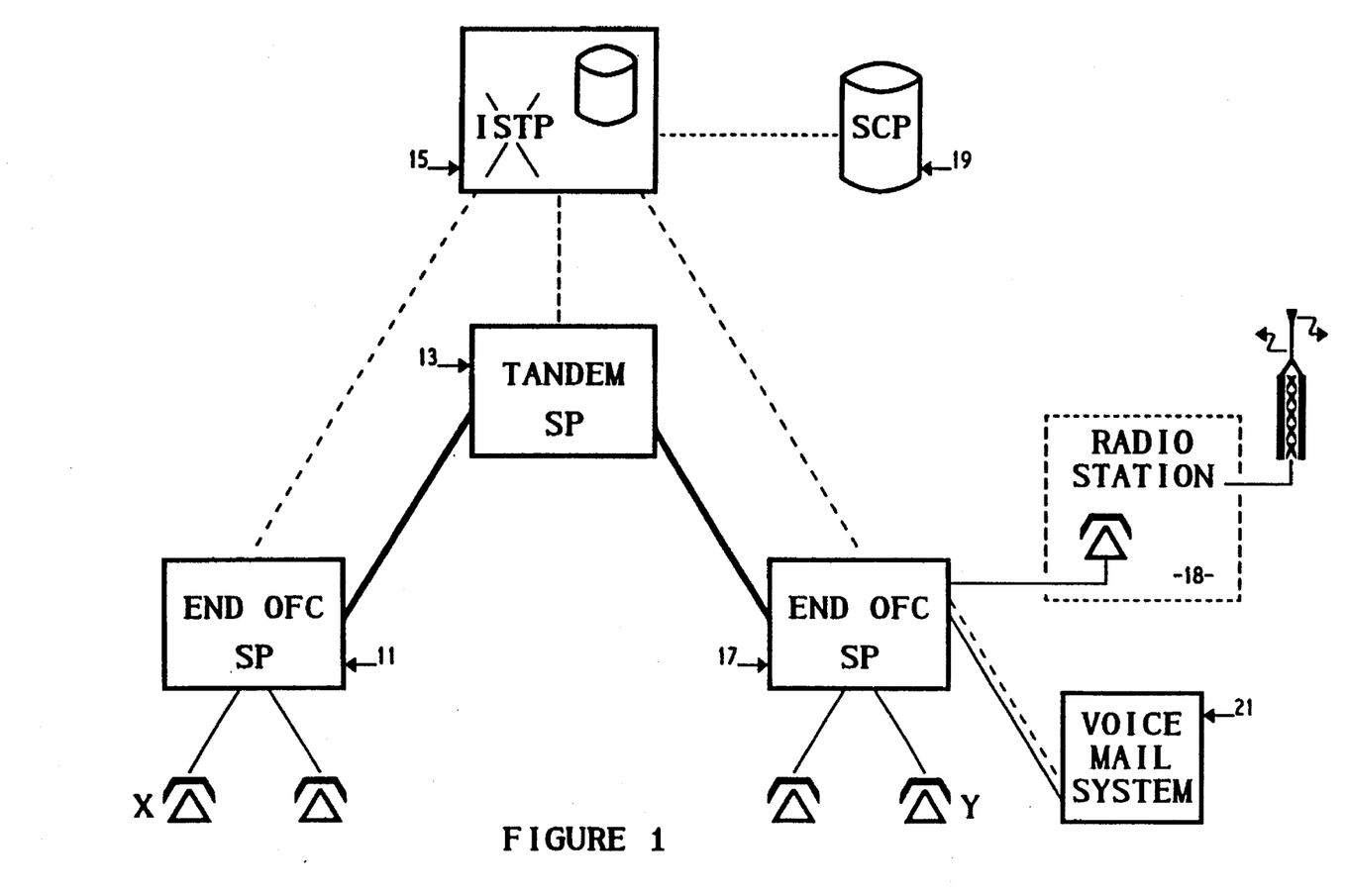
FIG. 1 is a simplified block diagram of a Public Switched Telephone Network and its SS7 signal control network, helpful in explaining the present invention.

Referring to FIG. 1 there is shown a simplified block diagram of a switched traffic network and the common channel signaling network used to transport the signaling messages that control call processing by the switched traffic network. Although the signaling message routing of the present invention will apply to other types of networks, in the illustrated example, the network is a telephone network.

In the illustrated example, the network includes a number of end office switching systems 11 and 17 providing connections to local communication links coupled to end users telephone station sets. Typically, the communication links are telephone lines (solid lines), although skilled artisans will recognize that other links could be used, such as broadband links, wireless links, etc. The network also includes one or more tandem switching systems 13 providing trunk to trunk connections between offices (bold solid lines). For convenience, only one tandem office 13 is shown. As such, the first telephone network consists of a series of switching offices interconnected by voice grade trunks.

Each switching office has SS7 signaling capability and is conventionally referred to as a signaling point (SP) in reference to the SS7 network. One or more of the each switching offices 11, 13 and 17 may also be programmed to recognize identified events or points in call (PICs). In response to a PIC, such an office 11, 13 or 17 triggers a query through the signaling network, for example to a Service Control Point (SCP) 19 for further instructions. Switching offices having such trigger and query capability are referred to as Service Switching Points (SSPs). As discussed more later, the SSPs may also address queries to the Intelligent Signaling Transfer Point (ISTP) 15. The SCP 19 may be part of an integrated services control point (ISCP) of the type disclosed in the above discussed Kay et al. Patent.

The end office and tandem switching systems typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

The illustrated network also includes a common channel interoffice signaling (CCIS) network. The CCIS network includes at least one Intelligent Signaling Transfer Points (ISTP) 15 and data links shown as dotted lines between the ISTP(s) and the various switching offices 11, 13 and 17. A data link also connects the ISTP 15 to the SCP 19. The structure of an exemplary ISTP in accord with the present invention will be discussed in more detail below, with regard to FIG. 5.

FIG. 1 shows one telephone line and associated telephone station connected to end office switching system 17 serving a radio station 18. One specific example of a call screening service discussed in detail below, relates to allowing only one call satisfying a predetermined threshold value to be completed to the line to the radio station 18. The network of FIG. 1 will also provide connections to other types of systems, such as voice mail system 21 and one or more intelligent peripherals or 'IPs' (not shown).

Although shown as telephones in FIG. 1, the terminal devices can comprise any communication device compatible with the local communication line. Where the line is a standard voice grade telephone line, for example, the terminals could include facsimile devices, modems etc.

Commonly assigned copending application Ser. No. 08/248,980, filed May 24, 1994, entitled "Advanced Intelligent Network with Intelligent Peripherals Interfaced to the Integrated Services Control Point" (attorney docket no. 680–076) provides a more detailed disclosure of an AIN type network, including the structure of an SSP switch and the structure of an IP, and the disclosure of that application is incorporated herein in its entirety by reference.

An end office switching system 11 or 17 shown in FIG. 1 normally responds to a service request on a local communication line connected thereto, for example an off-hook followed by dialed digit information, to selectively connect the requesting line to another selected local communication line. The connection can be made locally through only the connected end office switching system but typically will go through a number of switching systems. For example, when a subscriber at station X calls station Y, the connection is made through the end office switching system 11, the tandem office 13 and the end office switching system 17 through the telephone trunks interconnecting the various switching offices.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local (i.e. an interoffice call), the call must be completed through one or more distant central offices, and further processing is necessary. If at this point the call were connected serially through the trunks and appropriate central offices between the caller and the called party using in-band signalling, the trunks would be engaged before a determination is made that the called line is available or busy. Particularly if the called line is busy, this would unnecessarily tie up limited voice trunk circuit capacity. The CCIS system through the ISTP's was developed to alleviate this problem.

In the CCIS type call processing method, the originating end office switching system, switching system 11 in the present example, suspends the call and sends a message through the CCIS network to the end office switching system serving the destination telephone line, i.e. to a terminating end office 17. The terminating end office determines whether or not the line to the called station Y is busy. If the called station is busy, the terminating end office 17 so informs the originating end office 11 via CCIS message, and the originating end office provides a busy signal to the calling station. If the called station Y is not busy, the terminating end office 17 so informs the originating end central office 11. The terminating end office 17 applies ringing current to the line to called station Y, and the originating end office transmits a ringback signal over the line to calling station X. When the end office switching system 17 detects an off-hook on the line indicating an answer at station Y, that end office so informs the originating end central office 11. A telephone connection is then constructed via the trunks and end offices (and/or tandem offices) of the network between the calling and called stations.

For a service receiving AIN treatment or virtual number call processing (e.g. 800 number) based on data stored in the SCP 19, the end offices and/or tandems are SSP capable and detect one of a number of call processing events, each identified as a 'point in call' (PIC), to trigger AIN type processing. Specifically, in response to such a PIC, a tandem 13 or an end office switching system 11 or 17 suspends call processing, compiles a call data message and forwards that message via common channel interoffice signalling (CCIS) links and the ISTP 15 to an SCP 19. If needed, the SCP 19 can instruct the particular switching office to obtain and forward additional information. Once sufficient information has reached the SCP 19, the SCP 19 accesses its stored data tables to translate the received data into a call control message and returns the call control message to the switching office via the ISTP 15 and the appropriate CCIS links. The office uses the call control message to complete the particular call through the public switched network in the manner specified by the subscriber's data file in the SCP 19.

In accord with the present invention, the ISTP 15 screens various ones of the signaling messages in the call processing routines discussed above and provides responses to messages under certain conditions. For example, the ISTP 15 may pass CCIS query messages regarding a particular line to the terminating end office, if the incoming call meets certain criteria (occurs at a certain time, is from a certain area or caller, meets a specified call count value). If the incoming call does not satisfy the criteria, then the ISTP does not route the query message through to the terminating end office. Instead, the ISTP 15 provides an appropriate call processing instruction or response message, for example indicating that the called line is busy. Similar screening functions can be applied by the ISTP 15 to messages relating to outgoing calls from a particular subscriber's line, for example to limit who may place outgoing calls, to limit when such calls are and are not permitted, to limit how many long distance calls within a set period, etc. The ISTP 15 screens messages addressed to the SCP 19. Also, the ISTP 15 may itself function essentially like an SCP in processing at least some TCAP query messages. For example, the ISTP 15 itself may respond to a TCAP query regarding a particular customer's service by providing the appropriate TCAP call control response message based on that customer's CPR in the database in the ISTP.

To understand the message routing and processing of the present invention, particularly in the preferred embodiment, it will be helpful first to review the SS7 protocol.

Figure 2:
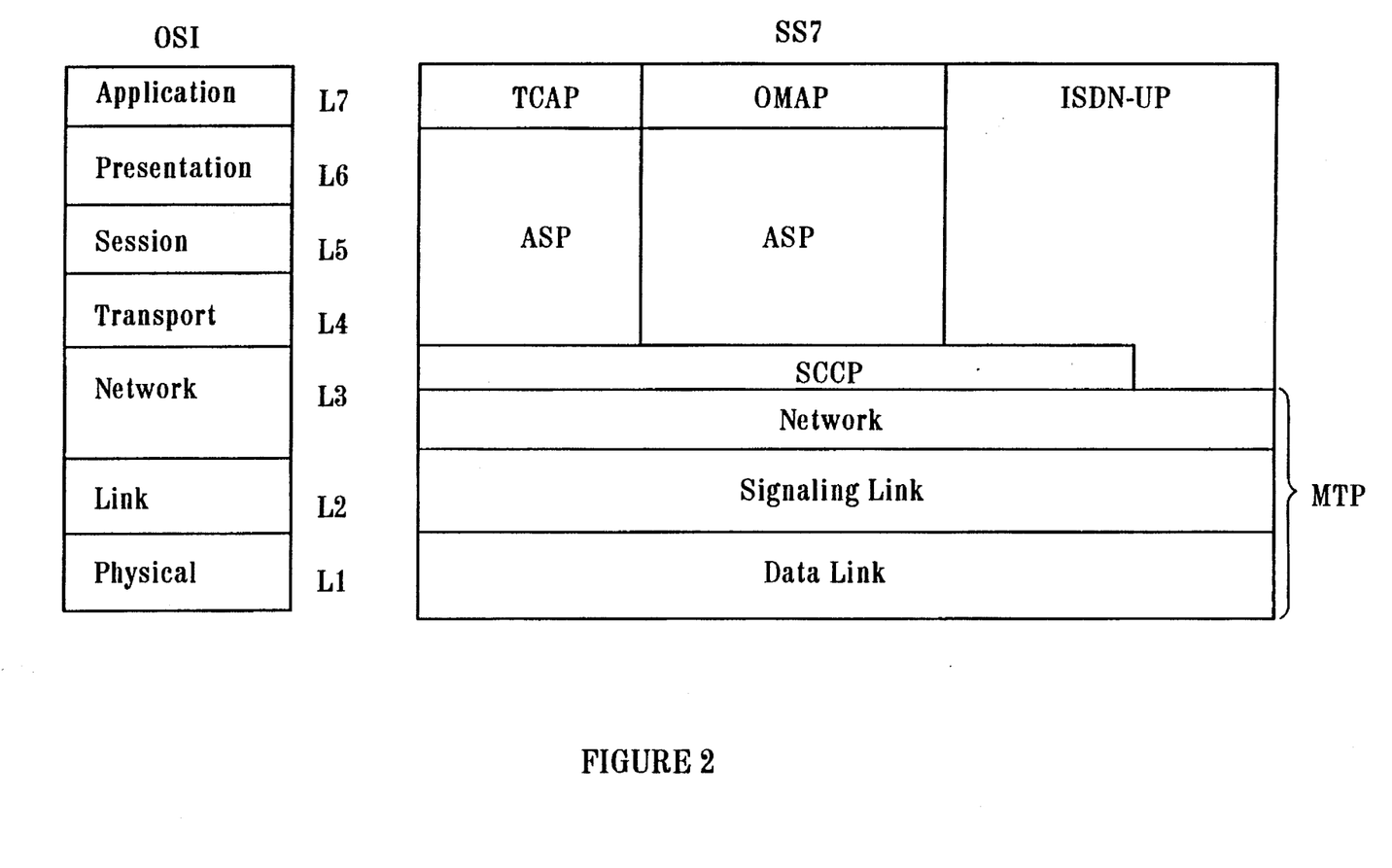
FIG. 2 depicts the protocol stack for SS7 and comparison thereof to the OSI model.

The International Standards Organization (ISO) Open Systems Interconnection (OSI) reference model specifies a hierarchy of protocol layers and defines the function of each layer in the network. FIG. 2 shows the OSI model and the relationship thereof to the protocol stack for SS7. The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g. set-up and tear-down of connections.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM) type query, and Address Complete Message (ACM) and Answer Message (ANM) type response messages.

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices, transfer points and databases in each network, is assigned a 9-digit pointcode for purposes of addressing signaling messages through the CCIS network. Both the SCCP protocol and the MTP processing utilize these point codes. It will be helpful to consider the format of SS7 messages and particularly the routing information contained in each message.

Figure 3:
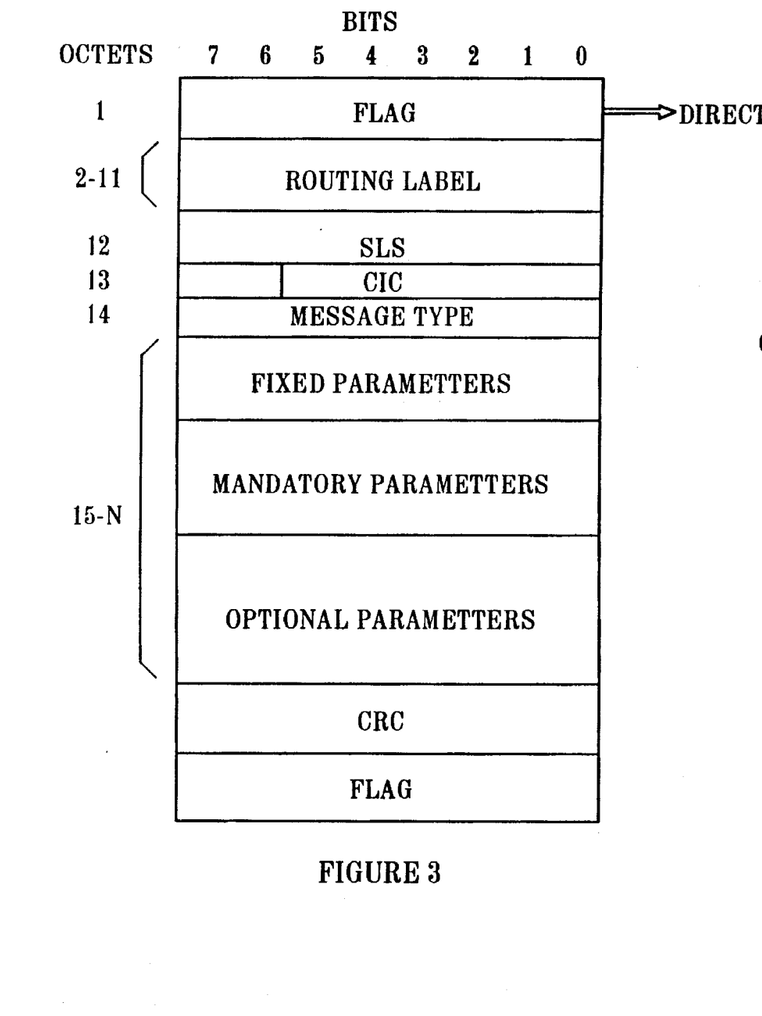
FIG. 3 illustrates in graphic form the layout of an SS7 protocol message packet.

The SS7 messages traverse the network at all times. The messages themselves comprise digital serial messages that come into the ISTP. FIG. 3 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 4. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15-N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

Figure 4:
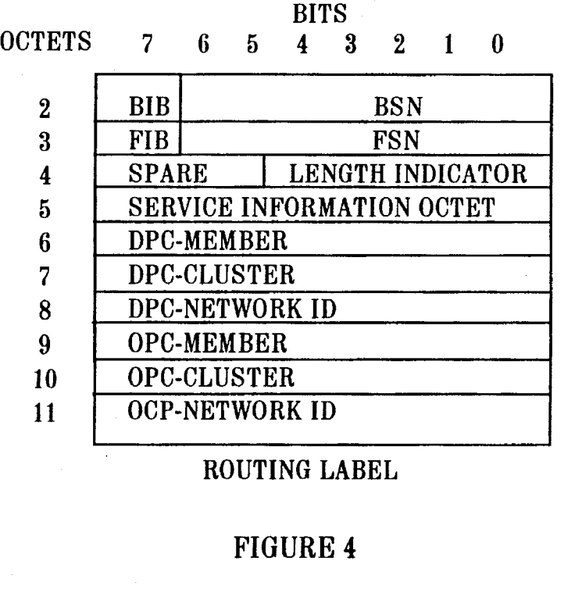
FIG. 4 illustrates in graphic form the layout of the routing label portion of the SS7 protocol message packet shown in FIG. 3.

FIG. 4 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. The destination or 'called party' address includes octets 6, 7 and 8. Octets 9–11 carry origination point code (OPC) information, for example member, cluster and network ID information.

In the example shown in FIG. 4, the three octets of the called party address contain an actual destination point code (DPC) identified as DPC-member, DPC-cluster and DPC-network ID information. In operation, the translation tables stored in a transfer point such as the ISTP cause the transfer point to actually route based on the DPC without translating any of the DPC octets into new values. The called party address octets (6–8), however, may carry other types of called party addressing information and receive different treatment by the ISTP. For example, these octets may carry a global title (GTT) and subsystem number (SSN) information. A transfer point utilizes a stored translation table to translate the GTT and SSN into an actual DPC, substitutes that DPC for the information in octets 6, 7 and 8, and then routes the message based on the DPC. As discussed more fully below, under certain circumstances, the ISTP will process application layer information from the SS7 message to determine whether to route or respond to the message. If the ISTP routes the message, the ISTP uses the actual DPC.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

Figure 5:
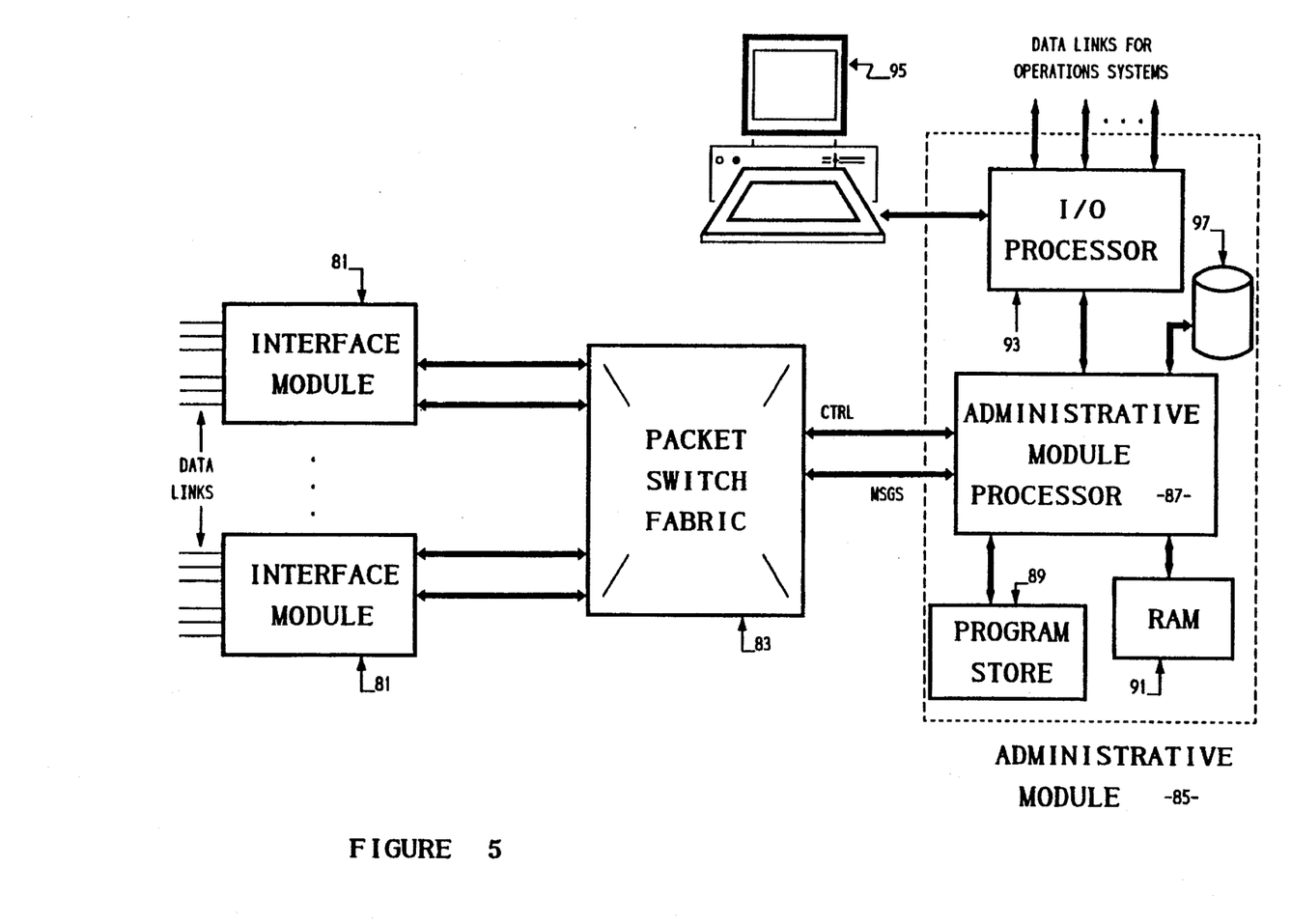
FIG. 5 is a functional block diagram of an Intelligent Signaling Transfer Point (ISTP) in accord with the present invention.

FIG. 5 depicts the functional elements of an ISTP, such as the ISTP 15 shown in the network of FIG. 1. As shown, the ISTP comprises interface modules 81, a packet switch fabric 83 and an administrative module 85. The interface modules 81 provide the physical connections to the two-way data links to the switching systems, SCPs, ISCPs and other ISTPs. Typically, these links provide two-way 56 kbits/s or 64 kbits/s virtual circuits between nodes of the CCIS signaling network. The modules 81 provide a two-way coupling of SS7 data packets, of the type shown in FIG. 3, between the actual data links and the packet switch fabric 83. The packet switch fabric 83 provides the actual routing of packets coming in from one link, through one of the interface modules 81 back out through one of the interface modules 81 to another data link. The packet switch fabric 83 also switches some incoming messages through to the administrative module 85 and switches some messages from the administrative module 85 out through one of the interface modules 81 to one of the data links, for example to trigger access to an internal database and formulate and send back an appropriate call control response message.

The administrative module 85 includes an administrative module processor 87, which is a computer equipped with RAM 91 and a program store 89, for overall control of operations of the switching office. Although shown as a logically separate element, the program store 89 typically is implemented as memory within the computer serving as the administrative module processor 87. The administrative module processor 89 provides control instructions to and receives status information from the operation control element (not shown) within the packet switch fabric 83. The administrative module processor 87 also transmits and receives some messages via the packet switch fabric 83 and the interface modules 81. The administrative module 85 also includes one or more input/output (I/O) processors 93 providing interfaces to terminal devices for technicians such as shown at 95 in the drawing and data links to operations systems for traffic recording, maintenance data, etc.

In accord with the present invention, the administrative module 85 also includes a database 97 storing call processing records (CPRs). The database 97 may be a Multi-Services Application Platform (MSAP) database similar to those used in existing ISCPs, although other types of databases can be used. The CPRs are customized to offer an array of intelligent services selected by individual customers.

The program store 89 stores program instructions which direct operations of the computer serving as the administrative module processor 87. The RAM 91 stores translation tables. In accord with the present invention, these translation tables control routing and/or processing of certain messages through the ISTP. First, these translation tables control translation and routing of those messages which do not trigger access to call processing records (CPRs) stored in a database 97. This includes global title (GTT) type translation and routing as well as routing based on actual DPC values included in the SS7 messages. The translation tables also specify point-in-routing (PIR) information to trigger access to the database 97. The RAM may be implemented as a disc storage unit, but preferably the RAM comprises a large quantity of semiconductor random access memory circuits providing extremely fast access to information stored therein.

In many installations, ISTPs are implemented as mated pairs, to provide a high level of redundancy. In a mated pair installation, each ISTP may include a call routing database 97, and the two ISTPs communicate to keep records stored therein up to date. Alternatively, there may be one database 97 shared between the two mated ISTPs. For example, all messages addressed to an SCP 19 would go through one of two ISTPs of a particular mated pair. Whichever ISTP received a particular message would access the appropriate CPR in the shared database 97 to determine how to process the signaling message and the associated call.

Figure 6:
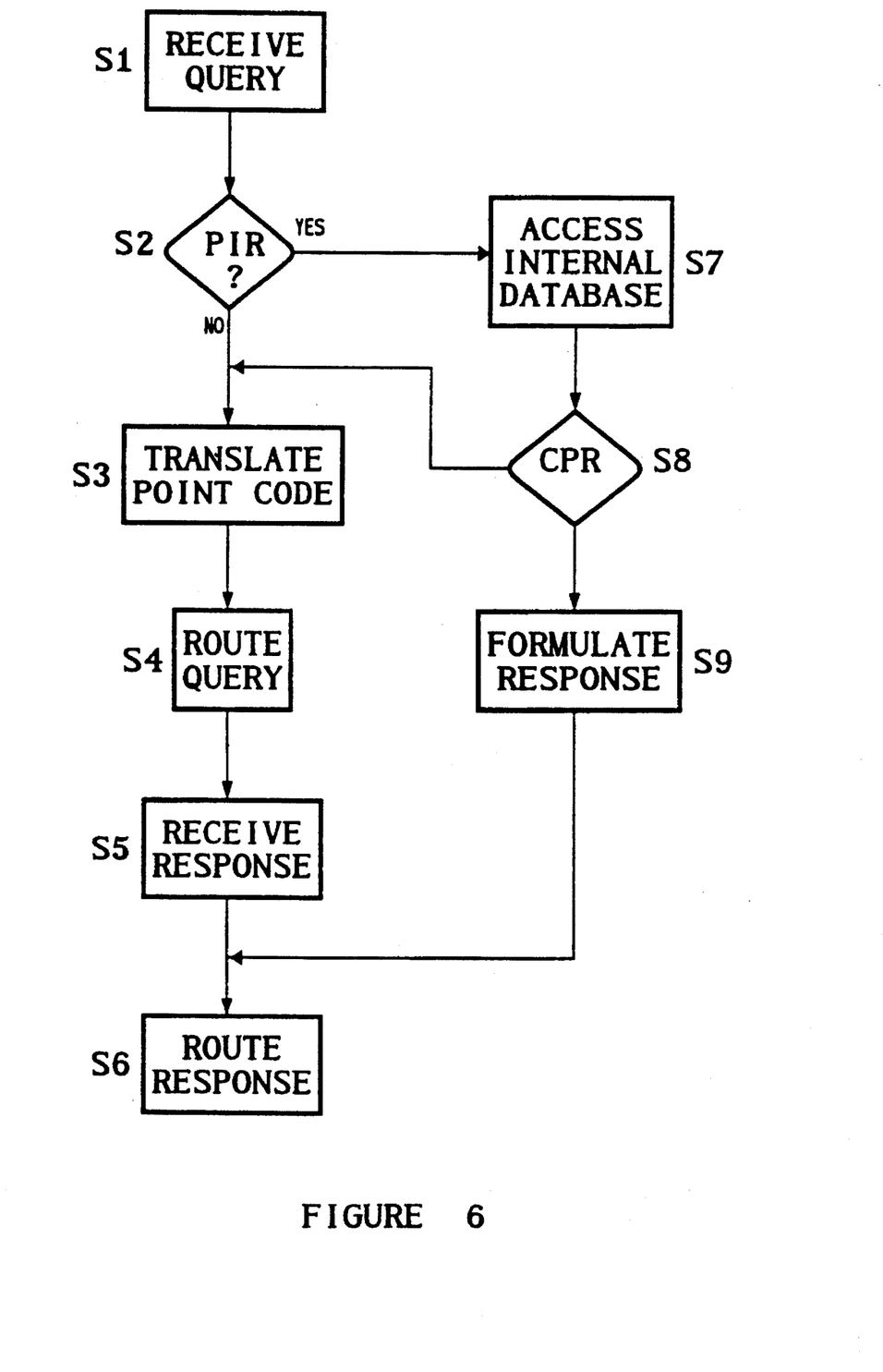
FIG. 6 is a simplified flow diagram of the message processing operations of the ISTP in accord with the present invention.

FIG. 6 is a high level flow diagram of the intelligent signaling message processing of the ISTP 15. As discussed below, the ISTP 15 routes a number of different types of messages. For most communications through the ISTP, one switching office initiates communication by launching a TCAP or ISDN-UP query to some other node of the network. The ISTP of the present invention recognizes the query messages and provides intelligent services in response to at least some of the query messages. Accordingly, whenever the ISTP 15 receives a query message (step S1), processing by the ISTP branches based on whether or not a point in routing (PIR) applies to the particular query (step S2). The PIR may be based on a variety of conditions relating to the query and the call to which the query relates. Typically, the administrative module processor 87 will examine at least some application level information from the query message to determine if a PIR applies.

If no PIR applies, then the ISTP should translate and route the message in the normal manner using GTT translation or routing based on a DPC included in the query message. Processing therefore branches to step S3. In step S3, the ISTP 15 translates the destination point code as appropriate, using translation information from the RAM 91. The ISTP 15 routes the query message to the destination using the translated point code information (step S4). Subsequently, the ISTP 15 will receive a response message from the node addressed by the translated query message (step S5). The response message includes actual point codes which are reversed from those in the query, i.e. the DPC from the query is now the OPC in the response and the OPC from the query is now the DPC in the response. The ISTP routes the response through the switch fabric (step S6), back to the office that launched the query.

However, when the ISTP 15 receives a query message (step S1), at step S2 the processing by the ISTP branches to step S7 if the administrative module processor 87 determines that a point in routing (PIR) applies to the particular query. The administrative module processor 87 identifies a CPR that relates to the present call and accesses that CPR in the database 97. The CPR controls further processing of signaling messages by the ISTP and the resultant processing of calls through the elements of the communication network.

The CPR typically causes branching of call processing based on subscriber specified criteria. This branching is shown in simplified form as step S8 in FIG. 6. In a number of the simplified call screening examples discussed below, the ISTP will forward the query message unchanged under certain conditions. If the query message satisfies those conditions or criteria, then the processing branches to step S3 for further processing of the type discussed above. The ISTP 15 translates the destination point code in the query message as appropriate (S3) and routes the query message to the destination using the translated point code information (step S4). Subsequently, the ISTP 15 will receive a response message from the node addressed by the translated query message (step S5). The ISTP routes the response through the switch fabric (step S6), back to the office that launched the query.

Returning to step S8, under different call related conditions or criteria, the CPR will indicate that the ISTP is to formulate an actual response message (step S9). In some of the examples, the query is in ISDN-UP protocol addressed to a terminating end office. In such a case, the ISTP formulates a response in a format that appears as if that office had responded, e.g. with a 'destination-busy' status indication. Alternatively, the query message may be in TCAP format and in some cases addressed to the ISTP itself. In response to such a TCAP query, the ISTP uses the CPR to translate information from the query into an appropriate call processing instruction, e.g. to route to a number, to play an announcement and collect digits, etc.

In either case, the ISTP translates the destination point code information from the original query message, if necessary, reverses the destination and origination point codes from the query message and uses the reversed point codes to control routing of the response message. The ISTP then routes the response type signaling message back to the switching office that launched the query (step S6).

In each case, the switching office receiving the response message from the ISTP will resume its processing of the call in accord with at least some information taken from the response message.

The present invention can provide AIN-like intelligent call processing functionalities without requiring setting of a trigger in an end office for every type of intelligent processing service. For example, the present invention can provide intelligent screening on both incoming and outgoing interoffice calls, without requiring a trigger in either the terminating or the originating office. Instead, the ISTP itself triggers database access, and in this case the screening functionality, in response to normal ISDN-UP query messages.

To facilitate an appreciation of the operation and advantages provided by the dynamic signaling message routing of the present invention, a few call screening examples are discussed below with regard to the network shown in FIG. 1. In this regard, consider first the simple example of a call from station X to station Y, wherein no call screening applies.

Each node of the signaling network, including the various switching offices and databases in each network, is assigned a 9-digit point code for purposes of addressing signaling messages through the CCIS network. For purposes of discussion, assume that in FIG. 1 end office 11 has a point code of 246-103-001, tandem office 13 has a point code of 246-103-002, and end office 17 has a point code of 255-201-104.

Consider now the simplest specific example of a call from station X to station Y wherein standard CCIS routing is to apply. The user at station X picks up his phone and dials the number of station Y. An administrative module processor within end office switch 11 loads subscriber profile information from disc storage into an available register in a call store. The number for station Y resides in end office 17. The SP end office 11 generates an Initial Address Message (IAM). The IAM message has the destination point code of end office 21, namely, point code 255-201-104. It also has an originating point code of end office 11, namely, 246-103-001, in addition to other miscellaneous information needed for call set-up such as the destination number of station Y and the calling party number of station X. The end office 11 transmits the IAM message over a data link to the ISTP 15.

The ISTP 15 looks at the message and determines that the message was not for it as an ISTP but rather is for end office 21. In this example, assume there is no PIR to trigger intelligent processing by the ISTP 15. The ISTP therefore executes its normal translation and routing process to forward the message to the correct end office 17.

End office 17 receives the IAM message which includes the called telephone number and determines whether or not the line is busy. In response to an IAM message, the end office 17 formulates an Address Complete Message (ACM). The ACM includes a variety of information, including a calling party status indicator, e.g. line free or busy. If the line is not busy, the end office 17 rings the station Y and generates an Address Complete Message (ACM) to indicate that it received the request for a call and that the number is not busy. The ACM message is sent back by simply reversing the point codes. Now the destination point code is that of end office 11 (246-103-001), and the originating point code is that of end office 17 (255-201-104). The message goes back to the end office 11 through the ISTP 15, to indicate that the IAM was received and processed. The return message (ACM in this case) does not result in translation or PIR triggering. In response to the ACM message, the originating end office 11 applies a ringback tone signal to the line to station X.

As soon as the phone is answered at end office 17, that office sends an Answer Message (ANM) back to end office 11 through the ISTP 15, indicating that the phone Y was picked up; and at that time the actual telephone traffic trunks are connected together through the tandem 13 and the trunks to the end offices 11 and 17. The return message (ANM in this case) includes an actual destination point code (the origination point code 246-103-001 from the IAM message) and does not result in translation or PIR triggering. End office 11 connects the line to station X to the trunk to tandem 13, and end office 17 connects the line to station Y to the trunk to the tandem 23, so that communication is established.

As a second example, assume that the call is to be screened based on criteria set by the calling party. The subscriber may establish other screening criteria, but for this simple example, assume that the subscriber at station X has elected to permit interoffice calls (including long distance calls) only during a predetermined time window. Again, the process starts when the user at station X picks up his phone and dials the number of station Y. The administrative module processor within end office switch 11 loads the subscriber profile information from disc storage into an available register in a call store. The number for station Y resides in end office 17. The SP end office 11 generates an Initial Address Message (IAM). The IAM message again has the destination point code of end office 21, namely, point code 255-201-104 and the originating point code of end office 11, namely, 246-103-001, in addition to other miscellaneous information needed for call set-up including the destination number of station Y and the calling party number of station X. The end office 11 transmits the IAM message over a data link to the ISTP 15.

To this point processing is identical to the steps in the immediately preceding example. However, the processing in the ISTP is quite different.

The ISTP 15 looks at the message and determines that the message relates to a calling subscriber's line having an intelligent call processing feature. More specifically, the translation information stored in the RAM 91 includes a point in call (PIR) triggering access to the subscriber's CPR in the database 97. The administrative module processor 85 therefore retrieves the CPR corresponding to the line to station X and uses that CPR to determine how to proceed.

Assume first that the call occurs outside of the window of time during which the subscriber has elected to permit interoffice calls. The call therefore should be blocked. In accord with the present invention, the administrative module processor 87 formulates an Address Complete Message (ACM). As noted above, the ACM includes a calling party status indicator, and in the present case, the processor 87 includes a busy status indicator in that field of the ACM. The processor 87 reverses the point codes from the IAM message, so that now the destination point code is that of end office 11 (246-103-001), and the originating point code is that of end office 17 (255-201-104). The processor 87 sends the ACM message back through the switch fabric 83 and the appropriate interface module 81 and data link to the end office 11. To the end office 11, the response message appears as if it came from the end office 17 in answer to the IAM query regarding the call from X to Y. In response, the end office 11 connects the line from station X to a busy tone trunk circuit, to provide a busy signal to the caller.

Assume now that a call from X to Y occurs within the window established by the subscriber. When the IAM query message reaches the ISTP 15, the administrative module processor 85 again retrieves the CPR corresponding to the line to station X and uses that CPR to determine how to proceed. In this case, however, the CPR indicates that the subscriber has elected to permit the call. The ISTP therefore executes its normal translation and routing process to forward the message to the correct end office 17, without modification. The end office 17 responds in the normal manner with the ACM message indicating whether or not the line to station Y is busy, and if not busy, the end offices 17 and 11 proceed to establish the connection between X and Y when a party answers at station Y, exactly as discussed above.

The above call screening based on time of day is but one simple example of a screening function, applied to outgoing calls, which may be provided by the present invention. Each subscriber may define their own customized screening procedure, and a corresponding customized CPR is set-up and maintained in the database 97. For example, the CPR in the database 97 may include screening criteria based on characteristics of the destination, e.g. to permit interoffice calls to only selected area codes and/or selected dialed numbers. As another alternative, the CPR in the database 97 may permit only a specified threshold number of interoffice calls within some time period, e.g. five calls a day. Those skilled in the art will recognize that the CPRs can and will include a variety of additional screening criteria, as defined by individual customers.

Also, the call processing of the present invention applies equally well to screen incoming interoffice calls, e.g. calls to the station Y. Consider now a simple example of a call from station X to station Y, with screening criteria established by the called party. The subscriber may establish other screening criteria, but for this simple example, assume that the subscriber at station Y has elected to permit only a predetermined maximum number interoffice calls per day (e.g. because of a standing arrangement to accept a limited number of collect calls). Again, the process starts when the user at station X picks up his phone and dials the number of station Y. The administrative module processor within end office switch 11 loads the subscriber profile information from disc storage into an available register in a call store. The number for station Y resides in end office 17. The SP end office 11 generates an Initial Address Message (IAM). The IAM message again has the destination point code of end office 21, namely, point code 255-201-104 and the originating point code of end office 11, namely, 246-103-001, in addition to the called and calling party numbers. The end office 11 transmits the IAM message over a data link to the ISTP 15. To this point processing is identical to the steps in the preceding examples.

The ISTP 15 looks at the message and determines that the message relates to a called subscriber's line having an intelligent call processing feature. More specifically, the translation information stored in the RAM 91 includes a point in call (PIR) triggering access to the called subscriber's CPR in the database 97. The administrative module processor 85 therefore retrieves the CPR corresponding to the line to station Y and uses that CPR to determine how to proceed.

In the present example, the ISTP maintains an incoming interoffice call count, as part of the CPR for the called subscriber. The ISTP will increment and store this count each time that it recognizes a call to the number assigned to station Y and will compare the incremented count value to a threshold value selected by the called subscriber. The ISTP resets the count value at the end of an agreed time period, e.g. at the end of the day in the present example, at the end of a month, etc.

If the incremented call count value for the call from X is below the threshold value, then the call should be completed to the line to station Y. The ISTP therefore executes its normal translation and routing process to forward the message to the correct end office 17, without modification. The end office 17 responds in the normal manner with the ACM message indicating whether or not the line to station Y is busy, and if not busy, the end offices 17 and 11 proceed to establish the connection between X and Y when a party answers at station Y, exactly as discussed above.

However, if the incremented call count value for the call from X is above the threshold value, then the call should not be completed to the line to station Y. In accord with the present invention, the administrative module processor 87 formulates an Address Complete Message (ACM). As noted above, the ACM includes a calling party status indicator, and in the present case, the processor 87 includes a busy status indicator in that field of the ACM. The processor 87 reverses the point codes from the IAM message, so that now the destination point code is that of end office 11 (246-103-001), and the originating point code is that of end office 17 (255-201-104). The processor 87 sends the ACM message back through the switch fabric 83 and the appropriate interface module 81 and data link to the end office 11. To the end office 11, this response message looks like a busy status indication, regarding the line to station Y, sent back by the end office 17. In response, the end office 11 connects the line from station X to a busy tone trunk circuit, to provide a busy signal to the caller.

As in the screening of outgoing calls, the present invention permits subscribers to select from a variety of different criteria to screen incoming calls. For example, the CPR in the database 97 may include screening criteria based on characteristics of the origin of the call, e.g. to permit incoming calls only from selected calling party line numbers.

The CPRs stored in the database 97 also provide intelligent network control of AIN related services activated by specific trigger events. In this regard, the ISTP of the present invention may actually replace a portion or all of the call processing control functionality of an ISCP. For this type of service, the CPRs formerly maintained in an ISCP are stored in the database 97 within the ISTP 17. When one of the switching offices 11, 13 or 17 detects a point in call (PIC) triggering a query transmission, the triggered switching office would send the TCAP query to the ISTP 15. The administrative module processor 87 within the ISTP 15 would access the appropriate CPR and formulate a TCAP call control response message in accord with the subscriber's customized service. The processor 87 sends the response message through the switch fabric 83 and the appropriate interface module 81 and data link to the switching office 11, 13 or 17 that launched the particular query. In response, the switching office processes the call using information from the TCAP response message.

Consider a simple call blocking example. Assume that caller Y has elected to have incoming calls from certain known parties passed through, but other calls should go to a voice mail system 21. A terminating attempt trigger is established in the subscriber profile record for the line to station Y within the end office switching system 17. When a call for station Y reaches end office 17, that office launches a TCAP query to the ISTP 15. The ISTP 15 looks at the query message and recognizes that the message is addressed to the ISTP itself. The TCAP query message includes a variety of information, such as the called and calling party telephone number and information indicating the type of trigger. The processor 87 within the ISTP analyzes the TCAP application portion of the message and determines that the message relates to the called line to station Y and retrieves the CPR corresponding to that line from the database 97 to determine how to proceed.

In the present example, the CPR identifies calling party telephone numbers for persons permitted access to the line to station Y. If the calling party number, e.g. the number for station X, is listed, then the call should be completed to the line to station Y. The ISTP therefore formulates a TCAP response message including a destination telephone number for the line to station Y and transmits that message through the SS7 link to end office 17. The end office 17 completes the call to the station Y using standard call processing. However, if the calling party number is that of a line not included in the list, then the CPR indicates that call should be completed to the line to the voice mail system 21. The ISTP therefore formulates a TCAP response message including a destination telephone number for the line to voice mail system 21 and transmits that message through the SS7 link to end office 17. The end office 17 completes the call to the voice mail system 21 and provides the voice mail system with appropriate signaling information to permit internal routing of the call to the called subscriber's mailbox.

Using the above discussed TCAP query and response procedure, the ISTP can offer virtually all incoming and outgoing service features previously offered by AIN through the CPRs maintained in the ISCP.

For still other services, the ISTP may screen signaling messages addressed to other databases, such as the SCP 19 shown in FIG. 1. One specific example is discussed in detail below with regard to FIG. 7. In this service example, a radio station 18 has advertised a contest. A predetermined caller is automatically the winner, for example, the tenth caller. The radio station has informed the network operator of the start of the call-in period, and the operator has programmed that information into the ISTP 15. At the start of that time (S71) callers begin calling an advertised 800 number.

Figure 7:
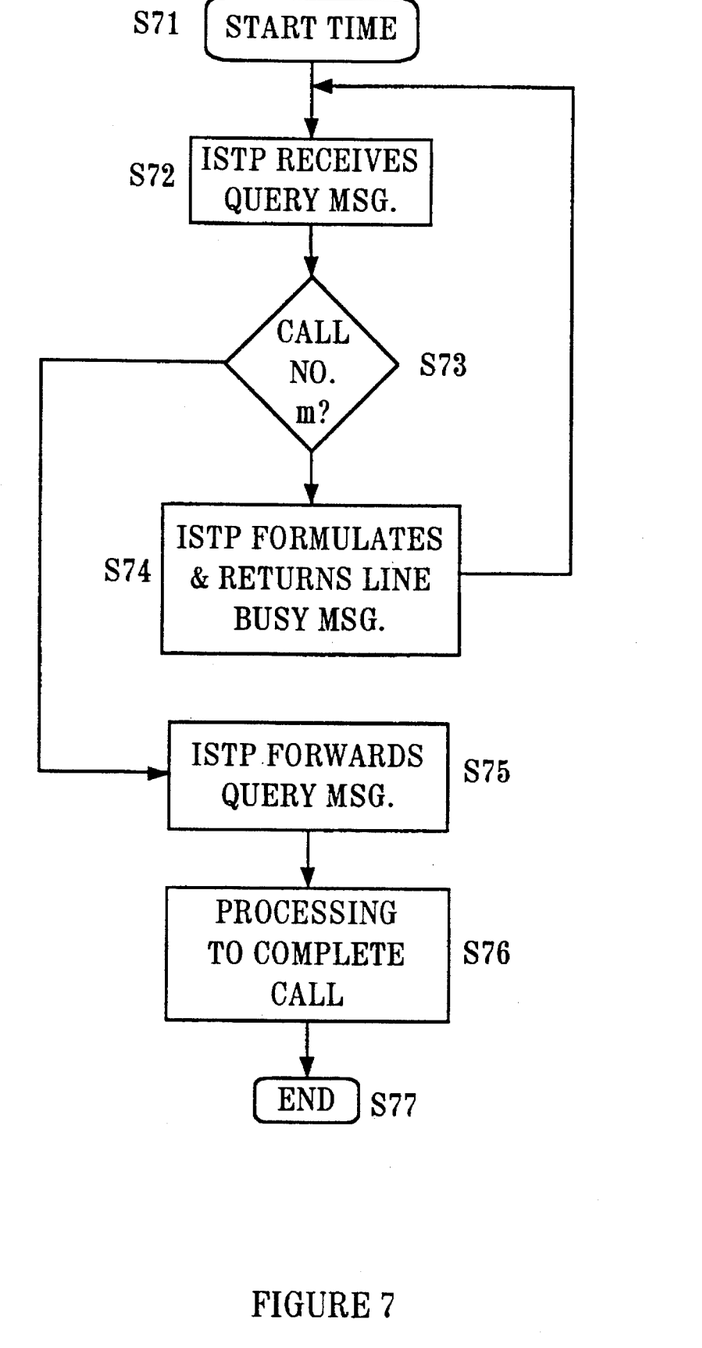
FIG. 7 is a simplified flow diagram of one specific call processing type service by the network of FIG. 1 in accord with the present invention.

Each time that a person at station X or station Y dials the 800 number, the end office 11 or 17 launches an SS7 message, containing a TCAP query. The query is addressed to the 800 database 19 using a global title (GTT) value and includes the dialed 800 number. Due to the addressing of these SS7 messages, all of these query message go to the ISTP 15 (S72).

Normally, the ISTP 15 would pass the 800 number related queries through to the database 19 using appropriate global title translations. In a system disclosed in commonly assigned U.S. patent application Ser. No. 08/418,107 filed Apr. 6, 1995 entitled Incoming Call Completion Threshold Restriction (attorney docket no. 680–120), the SCP (or ISCP) database screens calls and provides an instruction to complete only a call that meets a specified threshold, e.g. the tenth call. This however, requires a query and response transmission all the way to the SCP for every call.

In accord with the present invention, the ISTP 15 counts the number of query messages to identify the call meeting the specified threshold. Specifically, a PIR is set in the ISTP 15 with respect to TCAP query messages relating to the 800 number of the radio station 18. When the ISTP detects each query message regarding that 800 number, the ISTP checks the appropriate CPR in the database 97 to determine how to process the query message. The ISTP will increment and store this count each time that it recognizes a call to the 800 number assigned to radio station 18 and compares the incremented count value to a threshold value m selected by the subscriber (step S73), in this case the radio station. The ISTP resets the count value at the end of an agreed time period, e.g. after the end of the current contest.

Each time that the ISTP detects a query message relating to a new call to the particular 800 number, if the incremented message count does not correspond to the predetermined number 'm' (in the example, if the call is not the tenth call), then processing branches from step S73 to step S74. In step S74, the ISTP 15 formulates a busy message, analogous to a line busy type ACM message normally returned by destination end office 17 if a called line Y were busy. The ISTP forwards this message back to the end office 11 or 17 that launched the particular query, and that end office connects the call to an internal busy tone trunk circuit. After step S74, processing by the ISTP 15 returns to await receipt of the next call in step S72.

At step S73, when the call corresponds to the predetermined number 'm', for example when the SS7 message corresponds to the tenth call to the 800 number, then the ISTP forwards the query message (S75), and call processing continues in the normal manner. In the 800 number example, the query goes to 800 number database 19 which translates the dialed 800 number into the actual telephone number of radio station 18. The SCP 19 sends that telephone number back through ISTP 15 to the end office 11 or 17 that launched the tenth query, and the switching offices use that telephone number to complete the tenth call to the radio station 18.

The screening of signaling messages directed to the SCP 19 can utilize a variety of screening criteria, as in the earlier screening examples, and each subscriber receiving services controlled by that database can define their own personalized criteria to customize their individual services. Traffic on the SS7 network and work load on the SCP are reduced by forwarding the TCAP query messages only if a certain criteria is met, i.e. only if the call is the tenth call in the above example. The network need not relay signaling messages to an end office or to an SCP, and the network need not establish any actual voice call connections except for the one call meeting the specified criteria, e.g. the tenth call.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A network comprising:
   local communication links;
   a trunk circuit;
   at least two separately located central office switching systems interconnected via the trunk circuit for selectively providing switched call connections between at least two of the local communication links;
   a signaling transfer point for routing signaling messages; and
   signaling links coupling the signaling transfer point to the central office switching systems, said signaling links being separate from the local communication links and the trunk circuit;
   wherein the signaling transfer point comprises:
   (1) a data switch for switching messages between the signaling links,
   (2) a database storing call processing data associated with a plurality of the local communication links for control of call processing through one or more of the central office switching systems, and
   (3) a program controlled processor: (A) recognizing that a call satisfies a predetermined condition in response to at least one call related signaling message from one of the central office switching systems which is processing the call, and obtaining call processing information from the database, and transmitting a signaling message containing the call processing information to the one central office switching system to control subsequent processing of the call, and (B) controlling the data switch to route a further signaling message relating to a call not meeting the predetermined condition from one signaling link to another signaling link.

2. A network as in claim 1, wherein:
   the communication links are telephone links; and
   the central office switching system are telephone switches.

3. A network as in claim 2, wherein a plurality of the telephone links are telephone lines.

4. A network as in claim 1, wherein the signaling transfer point is adapted for sending and receiving signaling system 7 (SS7) compliant signaling messages.

5. A network as in claim 1, wherein the data switch comprises a packet data switching fabric.

6. A network as in claim 1, wherein:
   the network further comprises a service control point, separate from the central office switching systems and coupled to the signaling transfer point via a signaling link, said service control point comprising a database storing call processing data associated with a plurality of the local communication links for control of call processing through one or more of the central office switching systems; and
   the program controlled processor recognizes that the predetermined condition is not met with regard to another call related signaling message, and in response thereto the signaling transfer point routes said another signaling message to the service control point.

7. An intelligent signaling transfer point comprising:
   interface modules for providing two-way data communications to a plurality of common channel interoffice signaling links coupled to switching offices of a communication network;
   a data switch for switching messages between the interface modules;
   a database storing call processing data associated with a plurality of local communication links of the communication network for control of call processing through one or more of the central office switching systems; and
   a program controlled processor: (A) recognizing a predetermined condition regarding at least one call related signaling message from one of the central office switching systems which is processing a call, in response thereto obtaining call processing information from the database, and transmitting a signaling message containing the call processing information to the one central office switching system to control subsequent processing of the call, and (B) controlling the data switch to route a further signaling message not meeting the predetermined condition from one signaling link to another signaling link.

8. An intelligent signaling transfer point as in claim 7, wherein the data switch comprises a packet data switching fabric.

9. An intelligent signaling transfer point as in claim 7, wherein the interface modules and the data switch are adapted for sending and receiving signaling system 7 (SS7) compliant signaling messages.

10. A network comprising:

local communication links;

a trunk circuit;

at least two separately located central office switching systems interconnected via the trunk circuit for selectively providing switched call connections between at least two of the local communication links;

a service control point, separate from the central office switching systems, comprising a database storing call processing data associated with a plurality of the local communication links for control of call processing through one or more of the central office switching systems;

a signaling transfer point for routing signaling messages; and signaling links coupling the signaling transfer point to the central office switching systems and to the service control point, said signaling links being separate from the local communication links and the trunk circuit;

wherein the signaling transfer point comprises:

(1) a data switch for switching signaling messages between the signaling links (2) a database storing call processing data associated with a plurality of the local communication links for control of routing of signaling messages related to services provided to the plurality of the local communication links through the data switch; and (3) a program controlled processor controlling the data switch to route at least some incoming signaling messages from signaling links through to other signaling links, and in response to at least some other signaling messages meeting predetermined criteria, formulating responsive messages in accord with call processing data stored in the database and sending the responsive messages through signaling links.

11. A network as in claim 10, wherein:

the communication links are telephone links; and the central office switching systems are telephone switches.

12. A network as in claim 11, wherein a plurality of the telephone links are telephone lines.

13. A network as in claim 10, wherein the signaling transfer point is adapted for sending and receiving signaling system 7 (SS7) complaint signaling messages.

14. A network as in claim 10, wherein the data switch comprises a packet data switching fabric.

15. A network comprising:

local communication links;

a trunk circuit;

at least two separately located central office switching systems interconnected via the trunk circuit for selectively providing switched call connections between at least two of the local communication links;

signaling links coupled to the central office switching systems and carrying interoffice signalling messages, said signaling links being separate from the local communication links and the trunk circuit; and a signaling transfer point comprising a message routing fabric and a database, for receiving the signaling messages over the signaling links, transmitting signaling messages meeting at least one first predetermined condition from a signaling link coupled to one of the central office switching systems to a signaling link coupled to another of the central office switching systems; and in response to a signaling message from one of the central office switching systems meeting at least one second predetermined condition formulating a response message based on information from the database and transmitting the response message over a signaling link to the one central office switching system.

16. A network as in claim 15, wherein:

the communication links are telephone links; and the central office switching systems are telephone switches.

17. A network as in claim 16, wherein a plurality of the telephone links are telephone lines.

18. A network as in claim 15, wherein the signaling transfer point is adapted for sending and receiving signaling system 7 (SS7) compliant signaling messages.

19. A network as in claim 15, wherein the data switch comprises a packet data switching fabric.

20. A network as in claim 15, further comprising a services control point, separate from the central office switching systems and coupled to the signaling transfer point via a signaling link, said services control point comprising a database storing call processing data associated with a plurality of the local communication links and providing information for control of call processing through one or more of the central office switching systems in response to at least some of the signaling messages meeting at least one first predetermined condition.

21. In a network comprising:

local communication links;

a trunk circuit;

at least two separately located central office switching systems interconnected via the trunk circuit for selectively providing switched call connections between at least two of the local communication links;

a signaling transfer point for routing signaling messages; and signaling links coupling the signaling transfer point to the central office switching systems, said signaling links being separate from the local communication links and the trunk circuit, a method of processing a call comprising:

receiving the call over one of the local communication links at one of the central office switching system;

transmitting a query message containing information relating to the call and address information over one of the signaling links to the signaling transfer point;

accessing a database in the signaling transfer point based on at least a portion of the information contained in the query message to retrieve call processing information;

based on the call processing information, if a condition is met, then routing the query message based on the address information; and based on the call processing information, if the condition is not met, then formulating a response in the signaling transfer point and sending the response over one of the signaling links to the one central office switching system.

22. A method as in claim 21, wherein the network comprises a telephone network.

23. A method as in claim 21, wherein said at least a portion of the information contained in the query message relates to a calling party.

24. A method as in claim 23, wherein the condition is an outgoing call screening criteria selected by the calling party.

25. A method as in claim 21, wherein said at least a portion of the information contained in the query message relates to a called party.

26. A method as in claim 25, wherein the condition is an incoming call screening criteria selected by the called party.

27. A method as in claim 21, wherein the address information relates to a remote database containing call processing information.

28. In a network comprising:

local communication links;

a trunk circuit;

at least two separately located central office switching systems interconnected via the trunk circuit for selectively providing switched call connections between at least two of the local communication links;

a signaling transfer point for routing signaling messages; and signaling links coupling the signaling transfer point to the central office switching systems, said signaling links being separate from the local communication links being separate from the local communication links and the trunk circuit, a method of processing calls comprising:

receiving a first call over one of the local communication links at one of the central office switching system;

recognizing a predetermined condition of the first call as a trigger;

in response to recognition of the trigger, transmitting a query message containing information relating to the first call over one of the signaling links to the signal transfer point;

accessing a database in the signaling transfer point based on at least a portion of the information contained in the query message to retrieve call processing information;

formulating a response in the signaling transfer point based on the call processing information;

sending the response over one of the signaling links to the one central office switching system;

processing the first call in accord with the response; and processing a second call that does not meet the predetermined condition without accessing the database.

29. A method as in claim 28, wherein the network comprises a telephone network.

30. A method as in claim 28, wherein said at least a portion of the information contained in the query message relates to a calling party.

31. A method as in claim 28, wherein said at least a portion of the information contained in the query message relates to a called party.

32. A method comprising:

receiving a signaling message at a transfer point from a first node of a signaling network, said signaling message comprising content information relating to processing of a call through a communication network and routing information;

analyzing said content information;

if the analyzed content information satisfies a first predetermined condition, transmitting the signaling message including said content information from the transfer point through the signaling network to a second node of the signaling network in accord with the routing information; and if the analyzed content information satisfies a second predetermined condition, accessing call processing data stored in a database in the transfer point to formulate a response message, and transmitting the response message from the transfer point through the signaling network to the first node of the signaling network.

33. A method as in claim 32, wherein the signaling message is a data packet in signaling system 7 protocol format.

34. A method as in claim 33, wherein the second predetermined condition relates to predetermined Transaction Capabilities Applications Protocol content information in the signaling message.

35. A method as in claim 33, wherein the first predetermined condition relates to predetermined Integrated Services Digital Network User Part content information in the signaling message.

36. A method as in claim 35, wherein the second predetermined condition relates to predetermined Integrated Services Digital Network User Part content information in the signaling message.

37. A method as in claim 33, wherein the second predetermined condition relates to predetermined Integrated Services Digital Network User Part content information in the signaling message.

38. In a communication network having a plurality of interconnected central office switching systems at different locations, each of said central office switching systems connected through a plurality of local subscriber lines to subscriber stations, a voice network portion comprising voice communication paths for interconnecting two of said subscriber stations through at least one of said central office switching systems, a common channel signaling network portion comprising signaling paths interconnecting said central office switching systems through at least one signaling transfer point (STP) and a services control point (SCP) including a data base, a method for controlling call completion to one of said subscriber stations comprising the steps of:

in response to each call to a number associated with the one subscriber station, launching a query message addressed to the SCP through the common channel signaling network portion;

receiving each query message at the STP and in response thereto incrementing a call count value;

for each query message, comparing the call count value to a predetermined value stored in the STP;

only when receipt of one query message results in the call count value equaling the predetermined value, forwarding the one query message to the SCP;

in response to the one query message, accessing call processing information stored in the SCP;

transmitting a response message containing the call processing information to one of the central office switching systems to complete a call corresponding to the one query message to the one subscriber station.

39. A method as in claim 38, further comprising:

for each query message wherein the call count value does not equal the predetermined value, formulating in the STP a response message indicating a call station busy status and transmitting the response message indicating a call station busy status to one of the central office switching systems to supply a busy signal to a caller.

* * * * *